Patented Mar. 27, 1923.

1,449,943

UNITED STATES PATENT OFFICE.

ROBERT WILLIAM HILTON, OF CINCINNATI, OHIO.

INK.

Application filed March 11, 1922. Serial No. 543,087.

To all whom it may concern:

Be it known that I, ROBERT W. HILTON, a citizen of the United States, and residing at Cincinnati, in the county of Hamilton and State of Ohio, have invented a new and useful Improvement in Ink, of which the following specification is a full disclosure.

The invention relates to inks suitable for mimeograph or any machine of similar character.

The objects of my invention are to produce inks which remain moist in the pad and which at the same time have the quality of drying rapidly on paper so that after each operation of the mimeograph the printed sheets may fall one upon the other with the minimum amount of smudging and produce clear sharp work in large quantities. Also at the same time to produce inks for this purpose which have certain properties superior to inks which have hitherto been known and used for this purpose in that in the previously known inks only special pigments could be used, and lakes containing aluminum hydrate were not satisfactory owing to the fact that the aluminum hydrate re-acts with the glycerine and Turkey red oil, causing the ink to stiffen up and become unsuitable for good mimeograph work; while inks made according to my new process may contain lake colors in which aluminum hydrate has been used as an ingredient without any livering or thickening of the ink on standing indefinitely.

My new ink is an improvement on my ink covered in my Patents Nos. 928,915, and 928,450, issued to me under the name of Robert W. Hochstetter and which embraces inks especially suited for the mimeograph machine. It will be found in these two patents the basic points covered are the use of inert pigments which will not re-act with glycerine and Turkey red oil pigments containing aluminum hydrate, zinc oxide, white lead and magnesia when ground with Turkey red oil and glycerine will stiffen up and become unsuitable after standing.

My new process therefore is absolutely distinct from the processes covered in the two above mentioned patents, as entirely different pigments may be used and the vehicle used is not Turkey red oil as such, but the ammonia salt of Turkey red oil or the ammonia salt of other suitable sulfonate oils, while the other component which was glycerine under the old patent contains three hydroxy groups. I used propylene glycol or trimethylene glycol substances which contain only (2) two hydroxy groups and are therefore much less re-active toward pigments in general. It must be kept in mind that propylene glycol and trimethylene glycol are not isomers or merely substitutes for glycerine as they have distinctive properties entirely foreign to glycerine. Thus glycerine boils with decomposition under atmospheric pressure above 300° C. while trimethylene glycol boils at 210 to 215° C. without decomposition.

Propylene glycol boils at about 210° C. without decomposition. Furthermore, the penetration of glycerine into paper is much slower than the penetration of either propylene glycol or trimethylene glycol and the speed with which the ink dries or sets up when these two products are used in place of the glycerine is therefore much more rapid.

When the new vehicles are used in my new process the tendency of the pigments separating from the vehicle on standing is considerably less than those made according to the old patents mentioned above. A wider series of colors can be used in the manufacture of the new inks as the tendency of the pigments to re-act with the vehicle when using all kinds of pigments is reduced to a minimum.

In practice, I grind my pigments in a mixture of three (3) parts of the ammonia compound of Turkey red oil to one (1) part of propylene glycol or trimethylene glycol but I do not limit myself to this proportion.

After I grind my pigment or pigments in a mixture of sulfonated oil (to which an alkali preferably ammonia has been added) and trimethylene glycol, I need not reduce this heavy ink with an additional quantity of the same, but I can use a certain amount of castor oil with or without the addition of an oil varnish and obtain the correct body of the ink, and yet have a satisfactory product. I need not use trimethylene glycol alone but may use a mixture of it with propylene glycol, or propylene glycol alone may be used. In the case of the purple ink made from methyl violet pigments the color dissolves in the mixture of sulfonated oil (as such or its salts) and trimethylene glycol (or propylene glycol). The methyl violet dyestuff used as such in conjunction with a base can be employed in place of the purple pigment. Other basic dyes may be used in a similar manner.

As a specific example of my improved inks, I give the following examples:

Ink A.

Grind,
30 lbs. carbon black (gas) dry,
20 lbs. Prussian blue, dry,
10 lbs. aluminum hydrate, dry,
130 lbs. vehicle B.
Add,
600 lbs. vehicle B.

Ink C.

Grind,
20 lbs. carbon black (gas) dry,
20 lbs. Prussian blue, dry,
10 lbs. aluminum hydrate, dry,
130 lbs. vehicle B.
Add,
300 lbs. vehicle B,
300 lbs. castor oil,
150 lbs. thin R. V.

Vehicle B.

400 lbs. T. red oil 76–78% technical sulfonated castor oil,
37½ lbs. 28° ammonia,
150 lbs. trimethylene glycol.

Ink D.

Grind,
16 lbs. ultra blue, dry,
1¾ lbs. Prussian blue, dry,
16 lbs. vehicle B,
Add,
75 lbs. vehicle B.

Ink E.

Grind,
22 lbs. purple lake, dry,
22 lbs. vehicle B,
Add,
75 lbs. vehicle B.

I can add castor oil and oil varnishes to the vehicle B on reducing the grindings and obtain satisfactory inks.

It is apparent that the coloring matter may be organic or inorganic pigments ground in, or dyestuffs or the like dissolved in the carrier, the dominating feature of the invention being the use of trimethylene glycol and propylene glycol.

The invention does not hinge on the mere substitution of these two products for glycerine, but upon the discovery of the different and improved properties of trimethylene glycol and propylene glycol when used in a mimeograph ink.

Having described my invention, I claim:

1. An improved ink comprising a coloring substance, the ammonia salt of a sulphonated oil, and a glycol.

2. An improved ink comprising a coloring substance, an alkaline salt of sulphonated oil, and a glycol.

3. An improved ink comprising a coloring substance, an alkaline salt of sulphonated oil and a trimethylene glycol.

In witness whereof, I hereunto subscribe my name, as attested by the two subscribing witnesses.

ROBERT WILLIAM HILTON.

Witnesses:
R. KISTNER,
L. BECK.